(12) United States Patent
Pennisi, Jr.

(10) Patent No.: US 7,243,074 B1
(45) Date of Patent: Jul. 10, 2007

(54) CAPACITY MONITORING PROCESS FOR A GOODS DELIVERY SYSTEM

(75) Inventor: Frank Joseph Pennisi, Jr., Louisville, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/475,962

(22) Filed: Dec. 30, 1999

(51) Int. Cl.
*G06F 17/30* (2006.01)
(52) U.S. Cl. ............................................. 705/8; 705/7
(58) Field of Classification Search .................... 705/7, 705/8, 9, 10, 63, 6
See application file for complete search history.

(56) References Cited

U.S. PATENT DOCUMENTS

| | | | |
|---|---|---|---|
| 4,058,838 A | | 11/1977 | Crager et al. |
| 5,072,401 A | * | 12/1991 | Sansone et al. .............. 700/219 |
| 5,157,714 A | * | 10/1992 | Spicer ...................... 379/88.24 |
| 5,265,006 A | * | 11/1993 | Asthana et al. ................. 705/8 |
| 5,265,032 A | * | 11/1993 | Patel ........................... 702/188 |
| 5,528,489 A | * | 6/1996 | Asahara et al. ................ 705/9 |
| 5,758,329 A | * | 5/1998 | Wojcik et al. ................. 705/28 |
| 5,835,176 A | * | 11/1998 | Jeong et al. ................. 349/124 |
| 5,835,716 A | * | 11/1998 | Hunt et al. ................... 709/213 |
| 5,867,494 A | | 2/1999 | Krishnaswamy et al. |
| 5,867,820 A | * | 2/1999 | Cureton et al. ................. 705/1 |
| 5,960,408 A | * | 9/1999 | Martin et al. ................... 705/11 |
| 5,983,198 A | * | 11/1999 | Mowery et al. ............... 705/22 |
| 5,999,525 A | | 12/1999 | Krishnaswamy et al. |
| 6,026,378 A | * | 2/2000 | Onozaki ....................... 705/28 |
| 6,047,274 A | * | 4/2000 | Johnson et al. .............. 705/412 |
| 6,088,659 A | * | 7/2000 | Kelley et al. .................. 702/62 |
| 6,286,009 B1 | * | 9/2001 | Mattioli et al. ............. 707/102 |
| 6,289,382 B1 | | 9/2001 | Bowman-Amuah |

(Continued)

FOREIGN PATENT DOCUMENTS

EP 0 425 405 A2 * 2/1991

(Continued)

OTHER PUBLICATIONS

Chin et al., "Decision Support Models for Natural Gas Dispatch", Transportation Journal, Winter 1992 [retrieved on Dec. 13, 2002], vol. 32, No. 2, 7 pages, retrieved from: Dialog.*

(Continued)

*Primary Examiner*—B. Van Doren
(74) *Attorney, Agent, or Firm*—George L. Rideout, Esq.; Armstrong Teasdale LLP

(57) ABSTRACT

A method for determining capacity utilization and predicting the future capacity utilization of a goods delivery system from a supplier to a buyer utilizing a system having at least one delivery agent, at least one store, at least one manufacturer, and a plurality of buyers, wherein the at least one delivery agent, at least one store, and the at least one manufacturer are coupled to a communications network. The method comprises the steps of searching for the available capacity in each one of a plurality of markets wherein each market has at least one delivery zone, calculating the capacity utilization by day for each zone, setting a flag which is indicative of over capacity or undercapacity, determining the probability that the next day will be over capacity based on historical data, and determining the trend-line of capacity utilization based on historical data.

22 Claims, 5 Drawing Sheets

U.S. PATENT DOCUMENTS

| | | |
|---|---|---|
| 6,314,363 B1 | 11/2001 | Pilley et al. |
| 6,332,163 B1 | 12/2001 | Bowman-Amuah |
| 6,335,927 B1 | 1/2002 | Elliott et al. |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 2002/0046073 A1* | 4/2002 | Indseth et al. ............ 705/8 |
| 2003/0023465 A1* | 1/2003 | Smith et al. ............ 705/7 |
| 2004/0225507 A1* | 11/2004 | Smith et al. ............ 705/1 |

FOREIGN PATENT DOCUMENTS

| | | | |
|---|---|---|---|
| EP | 0 845 747 A2 | * | 3/1998 |
| JP | 01181199 A | * | 7/1989 |
| JP | 405135070 A | * | 6/1993 |
| JP | 09175599 A | * | 12/1995 |

OTHER PUBLICATIONS

Armistead et al., "The 'coping' capacity management strategy in services and the influence on quality performance", International Journal of Service Industry Management, 1994 [retrieved on Dec. 13, 2002], vol. 5, No. 2, 13 pages, retrieved from: Dialog.*

"FERC decides on service and EBBs, passes on demand charge question", Inside FERCs Gas Market Research, Dec. 31, 1993 [retrieved on Dec. 13, 2002], 3 pages, retrieved from: Dialog.*

Mendenhall et al., "A Second Course in Statistics", Prentice Hall, 1996, pp. 39-45 and 513-518.*

Silver, , Edward A., et al., "Inventory Management and Production Planning and Scheduling", Joney Wiley & Sons, Inc., 1998, pp. 423-424 and 440-444.*

* cited by examiner

CAPACITY MONITORING PROCESS FOR A GOODS DELIVERY SYSTEM

RELATED APPLICATIONS

This application is related to co-pending U.S. patent application Ser. No. 09/475,360, entitled: Internet Based Goods Delivery System", filed on Dec. 30, 1999, assigned to the assignee of the present invention, and herein incorporated by reference. This application is also related to co-pending U.S. patent application Ser. No. 09/475,961, entitled "Delivery Management System", filed on Dec. 30, 1999, assigned to the assignee of the present invention, and herein incorporated by reference.

BACKGROUND OF THE INVENTION

This invention relates to a capacity tracking system and more particularly to a Internet based goods delivery capacity tracking system.

At least one other company has employed an Internet based goods delivery system wherein the goods can be ordered from one particular store and delivered to a designated buyer's address. For example Home Depot Company has employed an Internet based appliance delivery system for more than a year. This system enables a buyer to place an Internet based order for a branded good, and the respective good be delivered to the buyers designated address. Once the order is placed the order is sent to a respective delivery agent via the Internet. The respective delivery agent then delivers the respective good. As such, this good delivery system is an order fulfillment system. This system has a number of disadvantages, including, for example: the system could not automatically generate order reschedules resulting from "refusals", "cancellations", "damaged" goods, "suspends", and "shorts"; nor is there ability to modify delivery capacity based on capacity utilization feedback.

Delivery management systems are known that provide Internet based delivery of standard sized packages, one particular example is the FEDERAL EXPRESS® goods delivery system. In this specification non-standard sized packages are packages that are not delivered by air carriers and mail delivery services, and typically are packages that weigh over about 100 lbs. (45 kg). The delivery of non-standard size packages generally requires a delivery agent who is equipped to ship and install the delivered goods. For example, there currently exists a plurality of appliance delivery services that receives the appliance from the appliance manufacturer, delivers and installs the appliance after the purchaser has ordered the appliance from a local appliance store. This entire operation is manually executed based on a delivery manifest. The delivery manifest is typically a document identifying the delivery agent's goods shipment schedule.

It is desirable to provide a system wherein delivery and installation capacity can be calculated by geographic area to provide information for feedback to optimize the delivery of goods. It is also desirable to predict future capacity of the goods delivery system. Finally, it is desirable to provide a goods delivery system that can be modified to maximize the delivery efficiency by providing trend line information about whether the capacity utilization is getting better or worse.

BRIEF SUMMARY OF THE INVENTION

Briefly, therefore, this invention provides for a method of determining capacity utilization and predicting the future capacity utilization of a goods delivery system from a supplier to a buyer utilizing a system having at least one delivery agent, at least one store, at least one manufacturer, and a plurality of buyers, wherein the at least one delivery agent, at least one store, and the at least one manufacturer are coupled to a communications network. The method comprises the steps of: getting the zone maximum and used slots for a specified period of time within the zone; determining whether the order can be shipped on the first potential ship date based on the number of available slots; returning the date that the order can be completely delivered to the buyer; and updating the respective capacity utilization matrix for the above specified period after the order has been factored into the available slots. The present invention is also adapted to set a work load utilization flag to over capacity and under capacity for each day in a zone, predict the probability that the next delivery day will be full based on historical work load capacity utilization, and predict the future capacity utilization trend line based on historical capacity utilization.

DETAILED DESCRIPTION OF THE INVENTION

Figure 1:
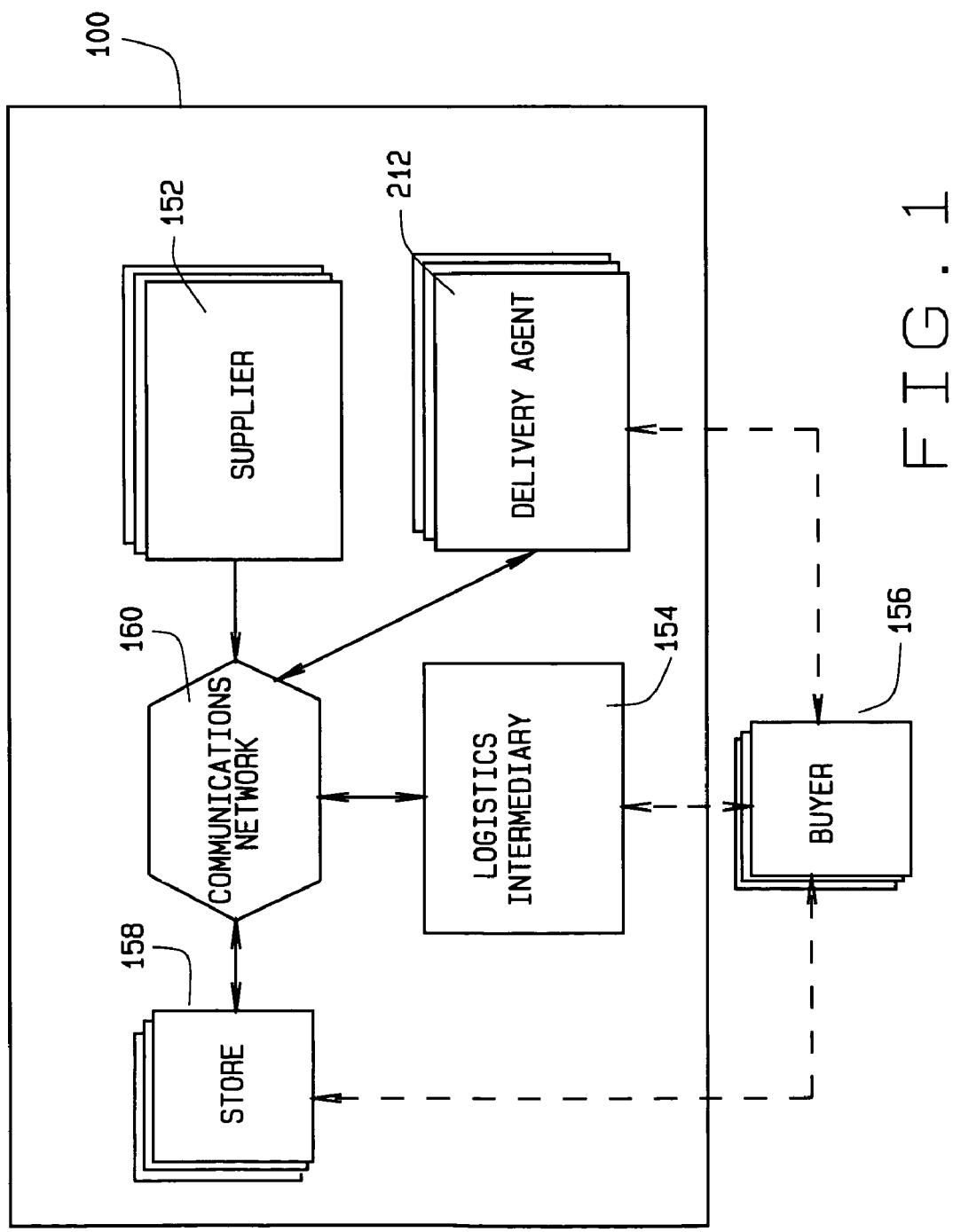
FIG. 1 is an illustration of the communication interchange between components of the goods delivery system of the present invention.
Figure 2:
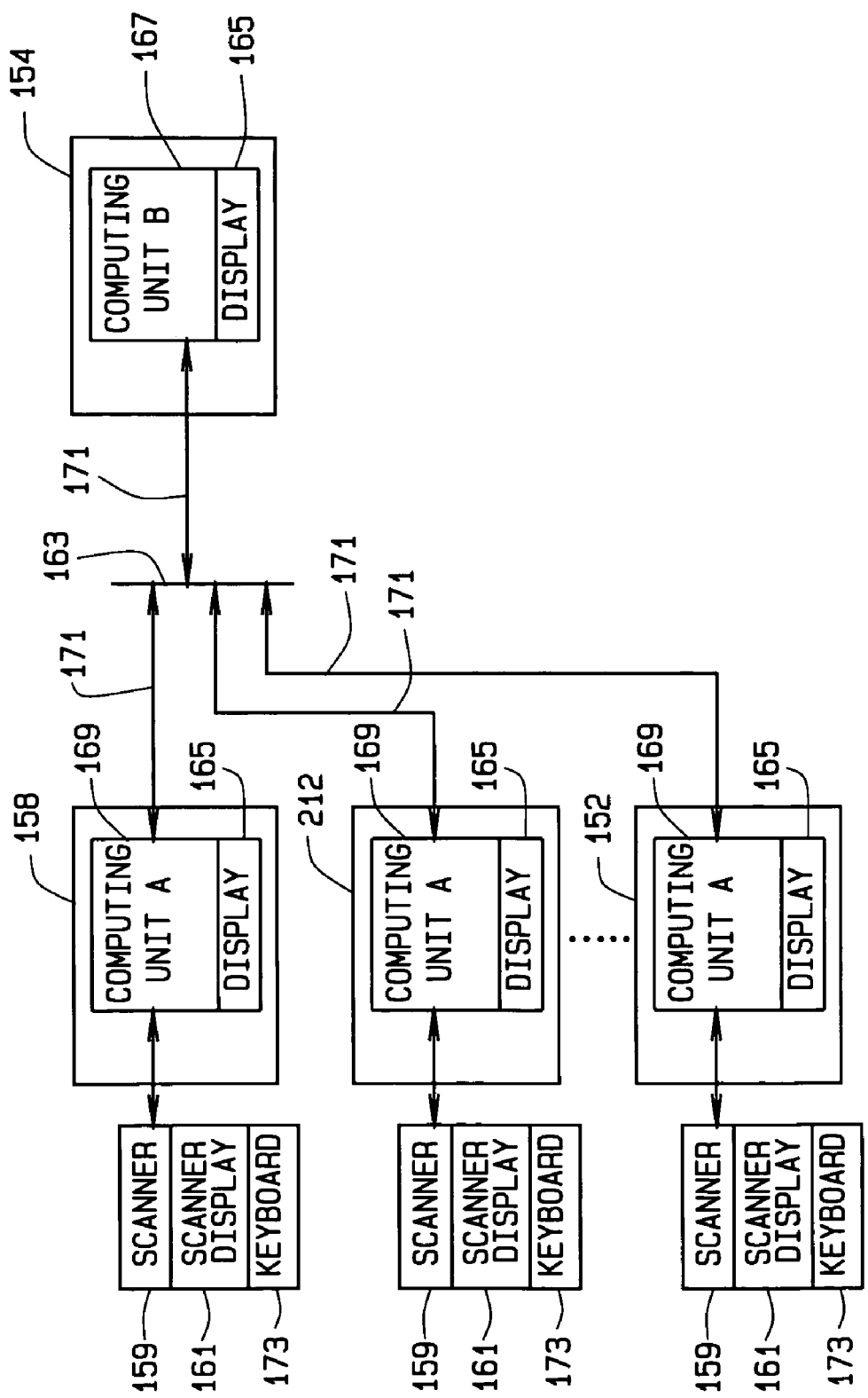
FIG. 2 is an further illustration of an Internet based communications network and associated elements illustration in FIG. 1.

Now referring to FIGS. 1 and 2, which illustrate the major components comprising goods delivery system 100, wherein like reference numbers identify like elements, goods delivery system 100 comprises components that cooperate in a process that integrates logistical supply chain parties by utilizing the Internet, commercially available scanners, and Internet based programs. The system creates the capability for a product distribution supplier to seamlessly interact with sellers of the supplier's products and suppliers to the sellers and buyers. Each supplier to the seller, and alternatively, to the buyer, is hereinafter defined as a delivery agent 212. All parties of the above identified logistical supply chain may execute roles and responsibilities while minimizing human interaction between the parties.

Goods delivery system 100 comprises at least one supplier 152, at least one delivery agent 212, a logistics intermediary 154, at least one store 158, and communications network 160. Additionally, a respective buyer 156 can interface with goods delivery system 100. Buyer 156 typically places an order at a respective store 158 requesting a desired good to be shipped, a desired delivery date, and a desired installation service. At each store 158 delivery agent 212 and supplier 152 there is at least one computing unit A 169, which is coupled to a computing unit B 167 via communications network 160. In one embodiment, communications network 160 comprises a Internet based communications link 171 and a web server 163. Communications link 171 may use audio and alternatively fiber optic communications means to support server 163 based communications. In one embodiment computing unit A 169 and computing unit B 167 communicate using the Transmission Control Protocol/Internet Protocol (TCP/IP). Server 163 is typically a Internet based server which interfaces with a plurality of browsers so as to effect Internet based communications. One exemplary server is the Netscape Application Server NAS. Computing unit A 169 and computing unit B 167 comprises a respective browser. One exemplary browser is the MICROSOFT INTERNET EXPLORER 4.0™. Computing unit A 169 may also comprise a commercially available display 165 and a commercially available scanner 159. Scanner 159 also has a scanner display 161, a keyboard 173, and is adapted to interface with computing unit A 169.

In an exemplary embodiment the server may be accessed by a respective computing unit A 169 and computing unit B 167 by providing a web address having a registered Uniform Resource Locator (URL) hyperlink "www.geappliances.com" and by providing an associated password on most commercially available web browsers. Computing unit B 167, located at logistics intermediary 154, houses the software which comprises the above referenced delivery management system and the capacity monitoring and prediction system of the present invention. It is noted computing unit B 167 may be located at any component of the goods delivery system, including, for example, store 158, delivery agent 212, and supplier 152. Computing unit B 167 provides a delivery management control process that effectuates control and enables information storage for goods delivery system 100. Additionally the delivery management system and the capacity monitoring and prediction system of the present invention may comprise a computer program storage medium readable by a computer system and encoding a computer program of instructions for executing a computer process for tracking and predicting the capacity utilization of a goods delivery system.

The delivery management system facilitates the scheduling of all deliveries from supplier 152 to buyer 156 by delivery agent 212, based on delivery date selection at the point-of-sale. The point-of-sale may, by way of example and not limitation, be respective store 158, respective supplier 152, respective delivery agent 212, or respective buyers delivery address. Co-pending U.S. patent application Ser. No. 09/475,630 provides details of the Internet based goods delivery system. Co-pending U.S. patent application Ser. No. 09/475,961 provides details of the delivery management system.

Figure 3:
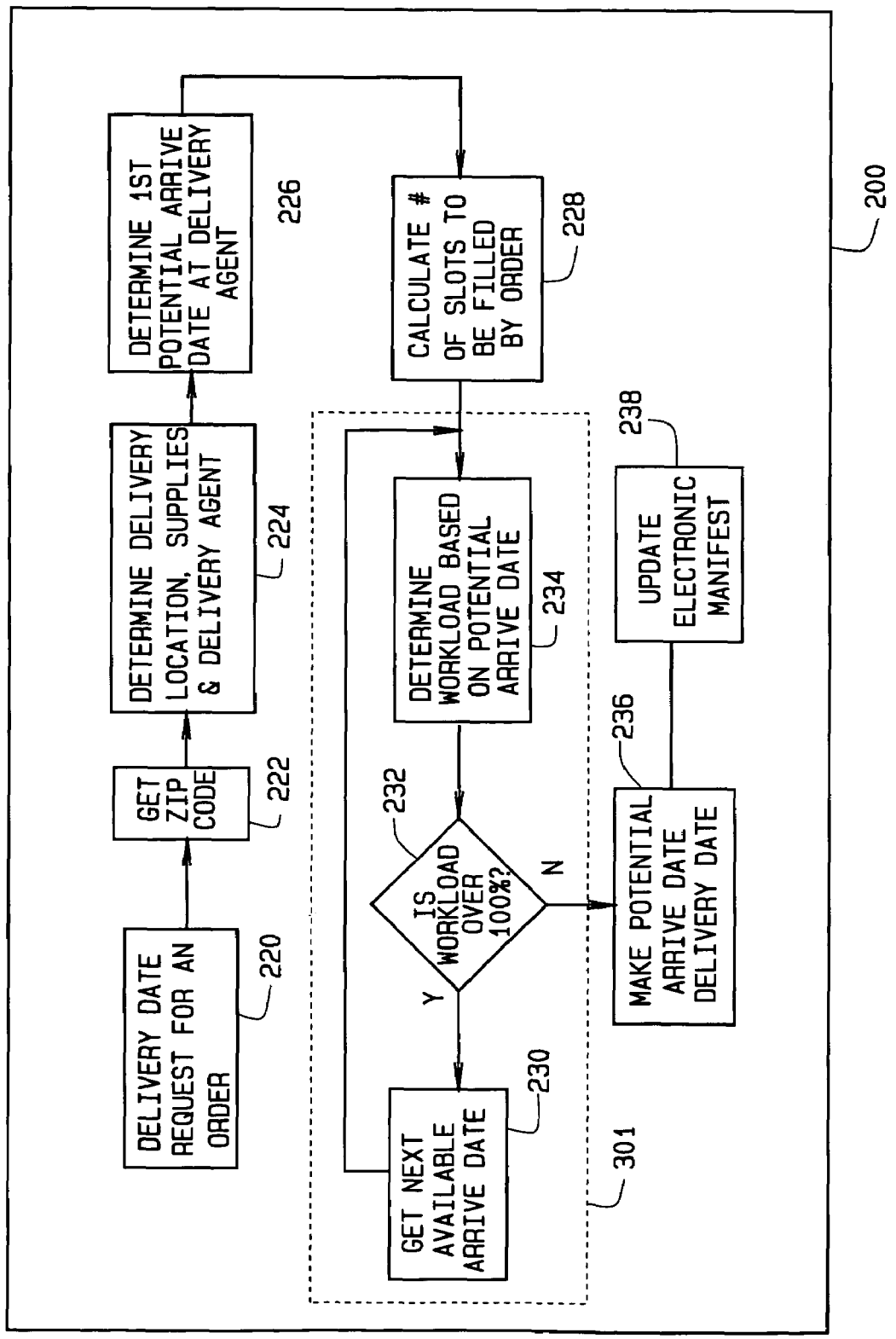
FIG. 3 is a process flow diagram of the delivery management system which utilizes the present capacity monitoring process of the present invention.

A delivery management system block diagram 200, as illustrated in FIG. 3, provides the process that controls the goods delivery system described in co-pending U.S. patent application Ser. No. 09/475,961. Delivery management system 200 facilitates the scheduling of all deliveries from suppliers, to delivery agent locations, then to the buyer or store regardless of goods supplier while allowing for delivery date selection at the point-of-sale. Scheduling is performed by day at a zip code and alternately at a zip group level.

The following benefits are realized with the present invention. The user has the ability to set workload capacity by geographic area to insure successful delivery on the selected delivery date chosen at the point-of-sale. The user has the ability to segregate geographic areas and allow for "sharing" of delivery slots to maximize utilization of the delivery agent's total capacity. The buyer has the ability to buy various branded goods from a plurality of suppliers. The delivery agent may tailor workload capacity by day of the week and has the ability to limit delivery capacity on holidays and special events. Additionally, the delivery agent may schedule deliveries and assign delivery vehicles as desired to maximize productivity. The user is defined in this specification to be delivery agent 212, store 158, logistics intermediary 154, supplier 152, buyer 156, and any agent acting in the capacity as the user in the identified list. For example, the agent may be a manager, a representative, or a viewer of the information only.

A supplier ship schedule defines the daily frequency that suppler 152 will ship goods to each respective delivery agent 212. For example, respective suppler 152 may ship goods to respective delivery agent 212 every Monday, Wednesday, and Friday. This schedule also includes a delay feature which accounts for the time interval from arrival at the delivery agents dock through the time that the good is available to be shipped to buyer 156. This delay feature, in effect, is a variable that can be modified to account for transit time and unloading time from supplier 152 to delivery agent 156. Table 1 illustrates one exemplary supplier ship schedule. The first row identifies the day the order is processed, which in this example can occur on any day from Monday through Sunday. The next row identifies the day the order is shipped from supplier 152. In this case it is based on a Tuesday and Thursday ship schedule and incorporates a 24 hour order processing delay. As such, for example, a Monday order will ship on Tuesday and a Tuesday order will ship on Thursday. Row three identifies the day the order arrives at the respective delivery agent's location. In this example 48 hours of delay are added to allow for transit time. Additionally, row four is the delay before the good is available for shipping from respective delivery agent 212 to buyer 156. As such, in this example, a Monday order will be available for shipment to buyer 156 on Friday and a Tuesday order will be available for shipment on the following Tuesday. It is understood that any shipping schedule may be used. Supplier 152 typically generates a unique shipping schedule for each delivery agent 212. The respective supplier ship schedule is loaded into electronic manifest 218 and can be modified at any time by respective supplier 152.

TABLE 1

Supplier Ship Schedule

| Order | Mon | Tue | Wed | Thu | Fri | Sat | Sun |
|---|---|---|---|---|---|---|---|
| Ship from Supplier | Tue | Thu | Thu | Tue | Tue | Tue | Tue |
| Arrive at delivery agent | Thu | Mon | Mon | Thu | Thu | Thu | Thu |
| Delay | Fri | Tue | Tue | Fri | Fri | Fri | Fri |

A delivery agent capacity matrix defines the delivery capacity and schedule for a defined delivery area to be served by delivery agent 212. Delivery agent 212 will have generated a capacity matrix residing in electronic manifest 218 for each zone associated with the delivery agent's delivery area. The delivery area is identified as at least one zone in a market in this specification. A market is an area that typically is defined by a metropolitan area. For example, the United States has a plurality of metropolitan areas, wherein each metropolitan area is associated with a city. It is understood that any markets, zones, and zip groups may be defined for any country in the world. A zone is the broadest geographical area of a delivery agent's territory and comprises a zip group, the zip group comprising at least one zip code. Within the territory of delivery agent 212 there is at least one zone. Within each zone there is at least one schedule type. Delivery agent 212 may choose to select and arrange zip groups so as to be able to vary service levels and vehicles or work crews. For each zip group within a zone, the delivery agent designates a maximum number of delivery slots for each delivery day, called the zone maximum, each delivery slot representing the respective delivery agent's delivery capacity for the day. For example, Table 2 is an illustration of one exemplary delivery agent capacity matrix for a zone. Row one identifies the day of the week. Row two identifies the zone maximum for each respective day. In this example the zone maximum number is 30 representing the total number of slots the delivery agent's vehicles can deliver in a day in the respective zone. For example, if this delivery agent has 3 vehicles and each vehicle can delivery 10 slots, then the delivery agent can deliver a total of 30 slots.

TABLE 2

Delivery agent capacity matrix for a zone

|  | Mon | Tue | Wed | Thu | Fri | Sat | Sun |
|---|---|---|---|---|---|---|---|
| Total slots for zone | 30 | 30 | 30 | 30 | 30 | 10 | 0 |
| Zip group 1 slots | 30 | 30 | 30 | 30 | 30 | 0 | 0 |
| Zip group 2 slots | 30 | 0 | 30 | 0 | 30 | 0 | 0 |
| Zip group 3 slots | 0 | 10 | 0 | 10 | 0 | 10 | 0 |

FIG. 3 illustrates the process of the delivery management system of which is utilized by the present invention. First a delivery date is requested for a respective brand of good, indicated in step 220. Next the zip code of the delivery address of the good is retrieved, step 222. Next, the zone of the delivery is determined from the zip code, step 224. The zone of the delivery also identifies the delivery agent that is selected. The brand of the good is used to identify the supplier ship schedule to be used. Next, the first potential arrival date of the order to the selected delivery agent is calculated, step 226. It is noted that if the order comprises more that one brand then the supplier ship schedule which represents the least delivery frequency is selected. Next, the number of slots to be used is calculated, step 228. Next, the delivery agent's change in workload for the potential arrival date is calculated based on the order size, step 234. Next, a determination is made as to whether delivery agent 212 has the capacity to ship the order on the identified date, step 232. If delivery agent 212 has the capacity, the potential arrival date is identified as the delivery date, step 236. And finally, the electronic manifest is updated to include the shipment, step 238. If the capacity of delivery agent 212 cannot accommodate the order the next ship date is selected, step 230. The workload utilization is recalculated utilizing the 100% workload of the previous date and the workload of the newly selected date, step 234. These steps are repeated until the complete order can be delivered, step 232. When the complete order can be delivered the potential arrive date is selected as the delivery date, step 236 and the electronic manifest is updated as before, step 238. The process identified by steps 230, 232, and 234 is further expanded to include the process of determining the capacity utilization and predicting the future capacity as defined by the present invention, process step 301.

Figure 4:
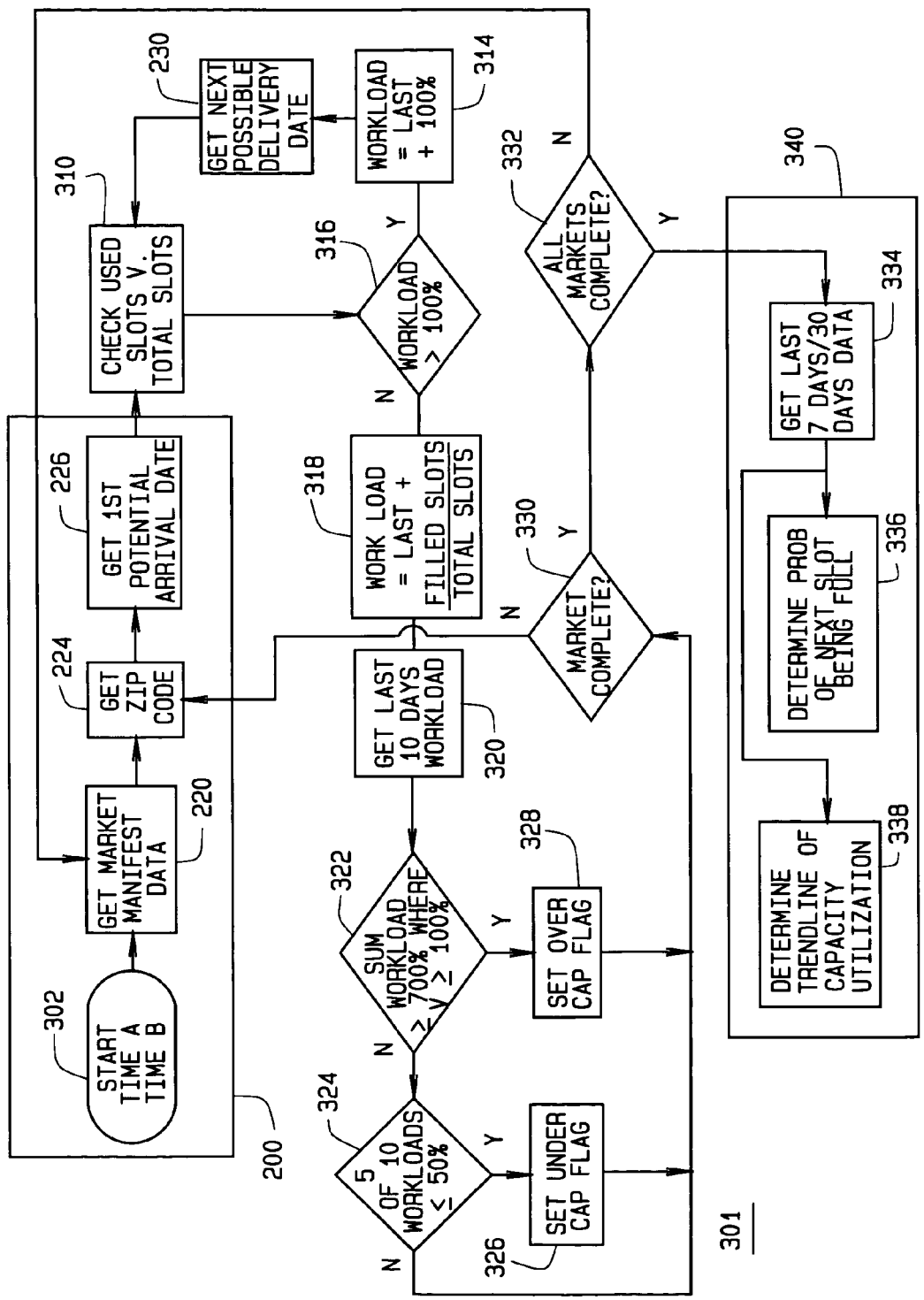
FIG. 4 is an process flow diagram of the capacity monitoring and prediction system of the present invention.

The process of determining the capacity utilization and predicting the future capacity is illustrated in FIG. 4. First, consider the additional detail provided in the capacity utilization matrix of Table 3, which is a further illustration of the capacity matrix illustrated in Table 2. Table 3 shows one example of a capacity utilization matrix of a zone for a given period of time, in this example the time period is a month. The date identifies the day. The zone max header, also identified as the zone maximum, indicates the maximum number of slots allocated to the specified day. The reserved header identifies the number of slots reserved that cannot be utilized. And the used slots header identifies the number of slots that have been utilized. Reserved slots are defined as those slots set aside as being used by delivery agent 212 which would otherwise be available slots. Store 158 may set reserve slots to hold otherwise available slots. Reserved slots are treated as used slots in the present invention.

TABLE 3

Capacity utilization matrix by month for a specified zone

|  | Mon | Tue | Wed | Thu | Fri | Sat | Sun |
|---|---|---|---|---|---|---|---|
|  |  |  |  |  |  | 1 | 2 |
| Date | 3 | 4 | 5 | 6 | 7 | 8 | 9 |
| Zone max | 30 | 30 | 30 | 30 | 30 | 0 | 0 |
| Reserved | 0 | 0 | 0 | 0 | 0 | 0 | 0 |
| Used slots | 0 | 0 | 0 | 0 | 0 | 0 | 0 |
|  | 10 | 11 | 12 | 13 | 14 | 15 | 16 |
|  | 17 | 18 | 19 | 20 | 21 | 22 | 23 |
|  | 24 | 25 | 26 | 27 | 28 | 29 | 30 |
|  | 31 |  |  |  |  |  |  |

The start block, step 302 of FIG. 4, indicates that the capacity calculation is generally executed only two times each day, at time A and at time B. For example time A may be at about 12:00 p.m. eastern time in the United States and time B may be at about 5:05 p.m. eastern time in the United States. Time A was selected to insure that there is a intermediate capacity utilization update during the time that the system is operational. Time B was selected so that a system wide capacity utilization calculation may be made after all electronic manifest updates are made for a given day.

A number of the workload calculation process steps are an integral part of delivery management system 200 (FIG. 3) but for the sake of logical continuity will be described herein. Market manifest information is obtained for a respective order, which minimally includes the order, model, the brand, the zip code, and the quantity, steps 220, 222 of delivery management system 200. Next, the zip group is determined, step 224 of delivery management system 200. Next, the first potential arrive date of the delivery agent is determined, step 226 of delivery management system 200. Next, the number of used slots and the number of reserved slots is subtracted from the zip group maximum for the potential arrive date, which calculation results in the number of available slots. The number of available slots is compared with the number of slots in the order, step 310 of FIG. 4. If the number of slots in the order is greater than the available slots a workload signal, which represents the percent utilization of the zip group for that day, is set to 100%. The next possible delivery date is next obtained, step 230 of delivery management system 200, then step 310 is repeated. If the workload is not greater than or equal to 100% the workload is updated to include the additional workload utilized as indicated the following equation: workload=(last workload+ (number filled slots)÷(zip group maximum)). The number of filled slots includes the number of available slots plus the number of slots in the order.

Next the last ten days of workload data for the zip group is obtained. From these ten days the days wherein the workload was greater than or equal to 100% are selected, step 320. If the sum of the selected days greater than or equal to 100% is greater than about 700% an over capacity flag is set to true for the day the test is performed, steps 322 and 328. If the workload of 5 of the last 10 days is less than about 50% an under capacity flag is set true for the day on which the test is performed, steps 324 and 326. As such, on a rolling bases any day may have associated with it a over capacity flag or an under capacity flag. It is understood that any other set of numbers to determine over capacity and under capacity may be utilized and that the numbers presented are but one exemplary illustration. Next, a determination is made as to whether the delivery area has any more zip groups, step 330. If the delivery area has another zip group the next zip group is obtained, step 224, and the above described process is repeated. If there is at least, one additional market the entire above described process is repeated on each market over the United States, step 332.

Figure 5:
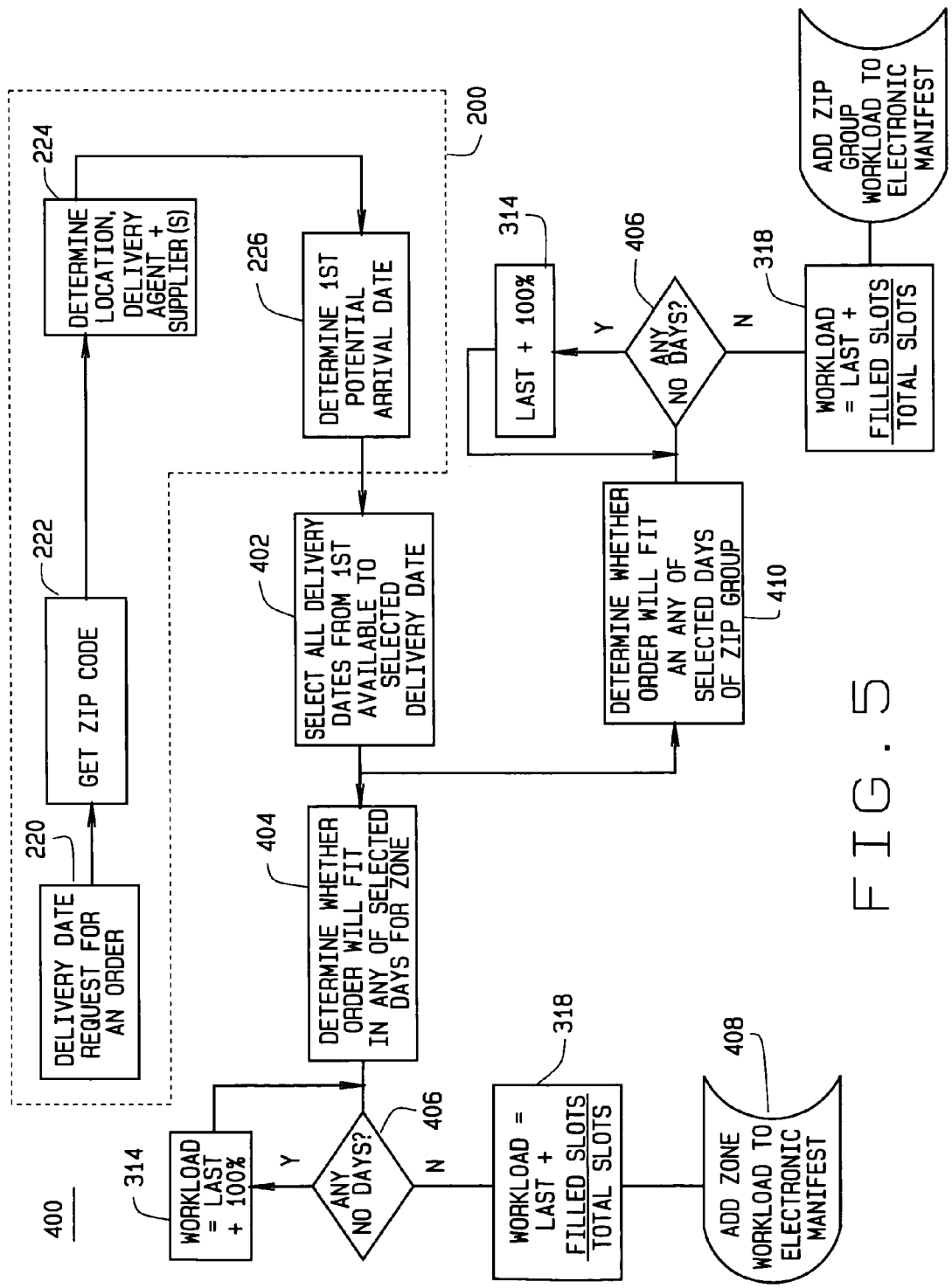
FIG. 5 is an alternative embodiment of the process flow diagram of the capacity monitoring system of the present invention.

An alternative embodiment of the process steps for determining capacity utilization is illustrated in FIG. 5. In this embodiment rather than workload for all markets being calculated at fixed intervals, the workload of the zone is calculated at the time the order is placed and stored in the electronic manifest. Also, a range of possible delivery dates are provided rather than a single delivery date. First a delivery date request is made, step 220. Next, the zip code is obtained for the order, step 222. Next, the delivery location, delivery agent 212, and supplier 152 is determined, step 224. Next, the first potential arrival date is determined, step 226, as described earlier. Next, the set of all delivery dates from the first potential arrival date to the requested date is determined (inclusive), step 402. Note step 402 includes all possible delivery dates that have less than 100% workload utilization by zone, but does not include historical dates, i.e., dates in the past. Next, a check is performed to see if the order can fit in each one of the set of delivery dates, and those dates that do not have sufficient workload are identified as a "No", steps 404 and 406. Next, for each day labeled a "No" 100% is added to the previous (workload value and the workload is calculated for the next ship day using the equation, workload=last workload+filled slots/zone maximum, steps 314 and 318. Next, the zone workloads are stored in the electronic manifest, step 408. The process is repeated for the zip groups as illustrated in steps 410 and 412. As such, two sets of numbers are provided to the electronic manifest the zone workload and the zip group workload. The delivery Management System identified in co-pending patent application Ser. No. 09/475,961 may use this method of determining capacity utilization.

The next process function is to calculate the future predicted capacity utilization, step 340 of FIG. 4. First, the last 7 and the last 30 days of workload signals are obtained, step 334. For this calculation an over capacity condition for a specified day is defined as the condition where the workload is greater than or equal to 100%. A mean over capacity calculation and a variance is calculated using standard distribution equations, based on the last 30 days of workload valves. In this example, a standard binomial probability distribution tables is utilized to provide the probability that the workload for the next day will be over capacity, given the last 30 days of over capacity conditions, step 336.

Probability (X=1)=b(x; n; p)=b(1;30;p)
n=30
p=(#of over capacity days in 30)
q=(1−p)

$$Z = \frac{X - np}{\sqrt{npq}}$$

X=1 (i.e. one occurrence of over capacity)

Where b(x; n; p) is the input to a binomial probability distribution and the Probability (X=1) is the probability that there will be one occurrence of over capacity given the histogram of over capacity conditions for the last 30 days. It is understood that future under capacity calculations may also be made by substituting the under capacity flag for the over capacity condition for the process described above and that any period of time may be used rather than the 30 day period used in this example. It is also understood that other distributions may be used such are a normal distribution and a "T" distribution. It is also understood that the above calculations may be performed on data covering a 7 day period.

Next, a trend line may be established indicating whether the capacity utilization for a fixed period is increasing or decreasing. A trend line of the capacity utilization is defined as a regression line resulting from a plot of the workload values over a given period of time, in this example thirty days. In one exemplary embodiment a determination is made as to whether the slope of the capacity utilization regression line for the last seven days is increasing or decreasing relative to zero, within about a 95% confidence interval. The statistically significant increasing capacity utilization is defined when the slope of the regression line for the last thirty days+1.96 multiplied by the standard deviation of the thirty day regression line slope is greater than zero. The statistically significant decreasing capacity utilization is defined when the slope of the regression line for the last thirty days+1.96 multiplied by the standard deviation of the thirty day regression line slope is less than zero, step 338. The future capacity prediction and trend line prediction for each zone is stored in electronic manifest 218. It is understood that the above calculations may be made over any time frame including a 7 day time frame.

The capacity probability and capacity trend line information may then be accessed by delivery agent 212 who can reallocate the number of slots based on this predicted future capacity utilization to insure that there is sufficient capacity in his delivery area. Additionally, logistics intermediary 154 can add or subtract delivery agents in metropolitan areas where there is an resource imbalance.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of maintaining an electronic manifest for tracking and predicting a capacity utilization of a goods delivery system, the goods delivery system having at least one delivery agent and at least one delivery zone comprising a geographic area comprising at least one zip group having at least one zip code, each delivery agent having at least one delivery vehicle comprising a plurality of delivery vehicle slots, each delivery vehicle slot defined as a portion of one of the delivery vehicles used to deliver a good, the goods delivery system providing a respective first potential delivery date for approval by a buyer, a respective order, and a number of delivery vehicle slots the respective order will fill, said method of maintaining an electronic manifest for tracking and predicting the capacity utilization comprising the steps of:

defining a delivery agent capacity utilization matrix for each delivery agent for a specific delivery zone, the delivery agent capacity utilization matrix comprises a number of delivery vehicle slots that the delivery agent has for use in the specific delivery zone, including a number of delivery vehicle slots for each zip group in the specific delivery zone, a total number of delivery vehicle slots in the specific delivery zone defining a zone delivery capacity of the delivery agent;

determining a respective zone maximum number of delivery vehicle slots and a respective number of used delivery vehicle slots for a specified period of time within the specific delivery zone, the respective zone maximum number of delivery vehicle slots defined by the sum of the zone delivery capacity of each delivery agent in the specific delivery zone;

determining whether the respective order can be shipped on the respective first potential delivery date based on a number of available delivery vehicle slots, wherein said respective number of available delivery vehicle slots is equal to said respective zone maximum number of delivery vehicle slots minus said respective number of used delivery vehicle slots;

returning a respective date that the respective order can be delivered based on the respective number of available delivery vehicle slots on the respective date for approval by the buyer;

updating the delivery agent capacity utilization matrix for the specified period in the electronic manifest after the respective order has been included within said respective number of used delivery vehicle slots;

calculating a zone workload signal for the delivery date approved by the buyer, the zone workload signal corresponding to a workload value for the delivery date approved by the buyer, the workload value equals (the respective number of used delivery vehicle slots including slots filled from the respective order approved by the buyer)/(the respective zone maximum number of delivery vehicle slots);

setting a capacity flag for each delivery date in the electronic manifest by comparing a sum of workload values to a predetermined over capacity value for said delivery date, the sum of workload values equals a sum of a plurality of workload values corresponding to a predetermined number of preceding delivery dates that immediately precede said delivery date, said setting a capacity flag comprising:

setting an over capacity flag for said delivery date if the sum of workload values is greater than or equal to the predetermined over capacity value for said delivery date; or setting an under capacity flag for said delivery date if the sum of workload values is less than the predetermined over capacity value for said delivery date;

predicting the capacity utilization of the goods delivery system for a time frame based on the workload value for each delivery date of a predetermined number of days preceding the time frame; and storing the predicted capacity utilization of the goods delivery system for the time frame in the electronic manifest.

2. The method of maintaining an electronic manifest for tracking and predicting a capacity utilization of a goods delivery system as recited in claim 1, wherein said predetermined over capacity value is about 700 percent and wherein the predetermined number of preceding delivery dates is the previous ten days.

3. The method of maintaining an electronic manifest for tracking and predicting a capacity utilization of a goods delivery system as recited in claim 1, further comprising a step of predicting a probability of a future respective used slot being full based on historical over capacity conditions.

4. The method of maintaining an electronic manifest for tracking and predicting a capacity utilization of a goods delivery system as recited in claim 3, wherein the step of predicting the probability of a future respective used slot being full further comprises steps of:

obtaining the workload values for a predetermined period of time; and determining the probability that the next used slot will meet an over capacity condition using a distribution function;

wherein said over capacity condition is defined as the state when the workload value is greater than or equal to 100 percent.

5. The method of maintaining an electronic manifest for tracking and predicting a capacity utilization of a goods delivery system as recited in claim 1, said step of predicting the capacity utilization of the goods delivery system comprises determining whether a trend line of the workload values of the time frame is changing.

6. The method of maintaining an electronic manifest for tracking and predicting a capacity utilization of a goods delivery system as recited in claim 5, wherein the step of predicting future capacity utilization further comprises a step of determining that the trend line of the capacity utilization is increasing when a slope of a regression line for a first fixed period of workload values is greater than zero, within a predetermined confidence interval.

7. The method of maintaining an electronic manifest for tracking and predicting a capacity utilization of a goods delivery system as recited in claim 6, wherein said first fixed period is seven days and said predetermined confidence interval is about 95 percent.

8. The method of maintaining an electronic manifest for tracking and predicting a capacity utilization of a goods delivery system as recited in claim 5, wherein the step of predicting future capacity utilization further comprises a step of determining that the trend line of the capacity utilization is decreasing when a slope of a regression line for a first fixed period of workload values is less than zero, within a predetermined confidence interval.

9. The method of maintaining an electronic manifest for tracking and predicting a capacity utilization of a goods delivery system as recited in claim 8, wherein said first fixed period is seven days and said predetermined confidence interval is about 95 percent.

10. The method of maintaining an electronic manifest for tracking and predicting a capacity utilization of a goods delivery system as recited in claim 1, wherein said specified period of time is thirty days.

11. A computer program storage medium readable by a computer system and encoding a computer program of instructions for executing a computer process for maintaining an electronic manifest for tracking and predicting a capacity utilization of a goods delivery system, the goods delivery system having at least one delivery agent and at least one delivery zone comprising a geographic area comprising at least one zip group having at least one zip code, each delivery agent having at least one delivery vehicle comprising a plurality of delivery vehicle slots, each delivery vehicle slot defined as a portion of one of the delivery vehicles used to deliver a good, the goods delivery system providing a respective first potential delivery date for approval by a buyer, a respective order, and a number of delivery vehicle slots the respective order will fill, said computer process comprising the steps of:

defining a delivery agent capacity utilization matrix for each delivery agent for a specific delivery zone, the delivery agent capacity utilization matrix comprises a number of delivery vehicle slots that the delivery agent has for use in the specific delivery zone, including a number of delivery vehicle slots for each zip group in the specific delivery zone, a total number of delivery vehicle slots in the specific delivery zone defining a zone delivery capacity of the delivery agent;

determining a respective zone maximum number of delivery vehicle slots and a respective number of used delivery vehicle slots for a specified period of time within the specific delivery zone, the respective zone maximum number of delivery vehicle slots defined by the sum of the zone delivery capacity of each delivery agent in the specific delivery zone;

determining whether the respective order can be shipped on the respective first potential delivery date based on a number of available delivery vehicle slots, wherein said respective number of available delivery vehicle slots is equal to said respective zone maximum number of delivery vehicle slots minus said respective number of used delivery vehicle slots;

returning a respective date that the respective order can be delivered based on the respective number of available delivery vehicle slots on the respective date for approval by the buyer;

updating the delivery agent capacity utilization matrix for the specified period in the electronic manifest after the respective order has been included within said respective number of used delivery vehicle slots;

calculating a zone workload signal for the delivery date approved by the buyer, the zone workload signal corresponding to a workload value for the delivery date approved by the buyer, the workload value equals (the respective number of used delivery vehicle slots including slots filled from the respective order approved by the buyer)/(the respective zone maximum number of delivery vehicle slots);

setting a capacity flag for each delivery date in the electronic manifest by comparing a sum of workload values to a predetermined over capacity value for said delivery date, the sum of workload values equals a sum of a plurality of workload values corresponding to a predetermined number of preceding delivery dates that immediately precede said delivery date, said setting a capacity flag comprising:

setting an over capacity flag for said delivery date if the sum of workload values is greater than or equal to the predetermined over capacity value for said delivery date; or setting an under capacity flag for said delivery date if the sum of workload values is less than the predetermined over capacity value for said delivery date;

predicting the capacity utilization of the goods delivery system for a time frame based on the workload value for each delivery date of a predetermined number of days preceding the time frame; and storing the predicted capacity utilization of the goods delivery system for the time frame in the electronic manifest.

12. The computer program storage medium as recited in claim 11, wherein said predetermined over capacity value is about 700 percent and wherein the predetermined number of preceding delivery dates is the previous ten days.

13. The computer program storage medium as recited in claim 11, further comprising a step of predicting a probability of a future respective used slot being full based on historical over capacity conditions.

14. The computer program storage medium as recited in claim 13, wherein the step of predicting the probability of the future respective used slot being full further comprises the steps of:

obtaining the workload values for a predetermined period of time; and determining the probability that the next used slot will meet an over capacity condition using a distribution function;

wherein said over capacity condition is defined as the state when the workload value is greater than or equal to 100 percent.

15. The computer program storage medium as recited in claim 11, said step of predicting the capacity utilization of the goods delivery system comprises determining whether a trend line of the workload values of the time frame is changing.

16. The computer program storage medium as recited in claim 15, wherein the step of predicting future capacity utilization further comprises the step of determining that a trend line of the capacity utilization is increasing when a slope of a regression line for a first fixed period of workload values is greater than zero, within a predetermined confidence interval.

17. The computer program storage medium as recited in claim 16, wherein said first fixed period is seven days and said predetermined confidence interval is about 95 percent.

18. The computer program storage medium as recited in claim 15, wherein the step of predicting future capacity utilization further comprises the step of determining that a trend line of the capacity utilization is decreasing when a slope of a regression line for a first fixed period of workload values is less than zero, within a predetermined confidence interval.

19. The computer program storage medium as recited in claim 18, wherein said first fixed period is seven days and said predetermined confidence interval is about 95 percent.

20. The computer program storage medium as recited in claim 11, wherein said specified period of time is thirty days.

21. A method of maintaining an electronic manifest for tracking and predicting a capacity utilization of a goods delivery system, the goods delivery system having at least one delivery agent and at least one delivery zone comprising a geographic area comprising at least one zip group having at least one zip code, each delivery agent having at least one delivery vehicle comprising a plurality of delivery vehicle slots, each delivery vehicle slot defined as a portion of one of the delivery vehicles used to deliver a good, the goods delivery system providing a respective first potential delivery date based on a selected potential ship date for approval by a buyer, a respective order, and a number of delivery vehicle slots the respective order will fill, said method of tracking and predicting the capacity utilization comprising the steps of:

defining a delivery agent capacity utilization matrix for each delivery agent for a specific delivery zone, the delivery agent capacity utilization matrix comprises a number of delivery vehicle slots that the delivery agent has for use in the specific delivery zone, including a number of delivery vehicle slots for each zip group in the specific delivery zone, a total number of delivery vehicle slots in the specific delivery zone defining a zone delivery capacity of the delivery agent;

determining a respective zone maximum number of delivery vehicle slots and a respective number of used delivery vehicle slots for a specified period of time within the specific delivery zone, the respective zone maximum number of delivery vehicle slots defined by the sum of the zone delivery capacity of each delivery agent in the specific delivery zone;

determining whether the respective order can be shipped on each day of a set of potential ship dates based on a number of available delivery vehicle slots, wherein said respective number of available delivery vehicle slots is equal to said respective zone maximum number of delivery vehicle slots minus said respective number of used delivery vehicle slots;

wherein said set of potential ship dates includes the respective dates from a selected potential ship date to a first determined potential ship date;

returning an indication of the respective dates that the respective order can be delivered within said set of potential ship dates based on the respective number of available delivery vehicle slots on the respective date for approval by the buyer;

updating the delivery agent capacity utilization matrix for the specified period in the electronic manifest after the respective order has been included within said respective number of used delivery vehicle slots;

calculating a zone workload signal for the delivery date approved by the buyer, the zone workload signal corresponding to a workload value for the delivery date approved by the buyer, the workload value equals (the respective number of used delivery vehicle slots including slots filled from the respective order approved by the buyer)/(the respective zone maximum number of delivery vehicle slots);

setting a capacity flag for each delivery date in the electronic manifest by comparing a sum of workload values to a predetermined over capacity value for said delivery date, the sum of workload values equals a sum of a plurality of workload values corresponding to a predetermined number of preceding delivery dates that immediately precede said delivery date, said setting a capacity flag comprising:

setting an over capacity flag for said delivery date if the sum of workload values is greater than or equal to the predetermined over capacity value for said delivery date; or setting an under capacity flag for said delivery date if the sum of workload values is less than the predetermined over capacity value for said delivery date;

predicting the capacity utilization of the goods delivery system for a time frame based on the workload value for each delivery date of a predetermined number of days preceding the time frame; and storing the predicted capacity utilization of the goods delivery system for the time frame in the electronic manifest.

22. The method of maintaining an electronic manifest for tracking and predicting a capacity utilization of a goods delivery system as recited in claim 21, wherein said predetermined over capacity value is about 700 percent and wherein the predetermined number of preceding delivery dates is the previous ten days.

\* \* \* \* \*